Sept. 20, 1966 L. J. SMITH, JR 3,273,262
TEACHING DEVICE
Filed July 27, 1964 3 Sheets-Sheet 1

INVENTOR.
LUKE J. SMITH, JR.

BY Kenwood Ross
ATTORNEY.

Sept. 20, 1966  L. J. SMITH, JR  3,273,262
TEACHING DEVICE
Filed July 27, 1964  3 Sheets-Sheet 2
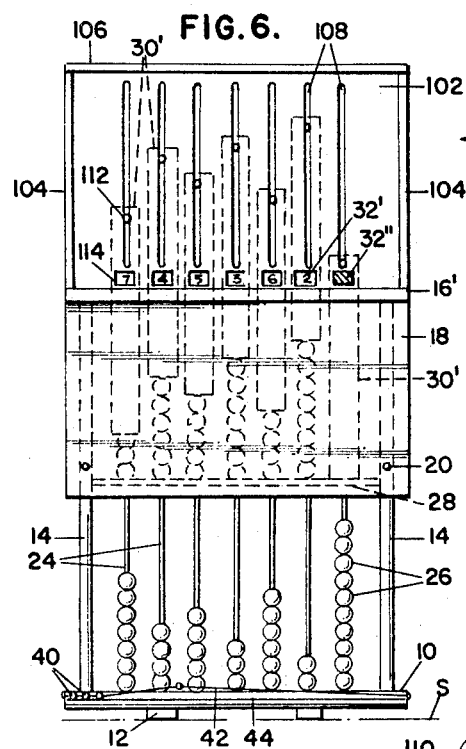
FIG. 6.
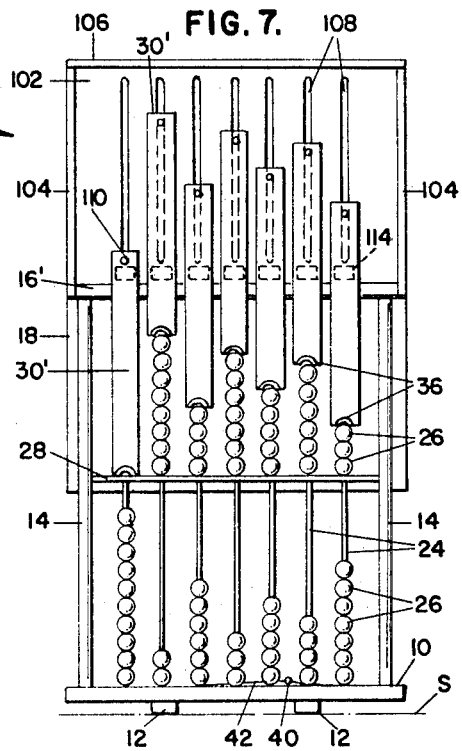
FIG. 7.
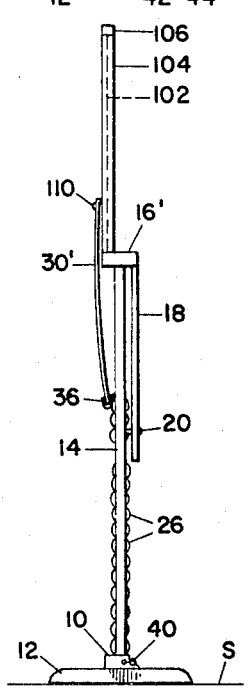
FIG. 8.
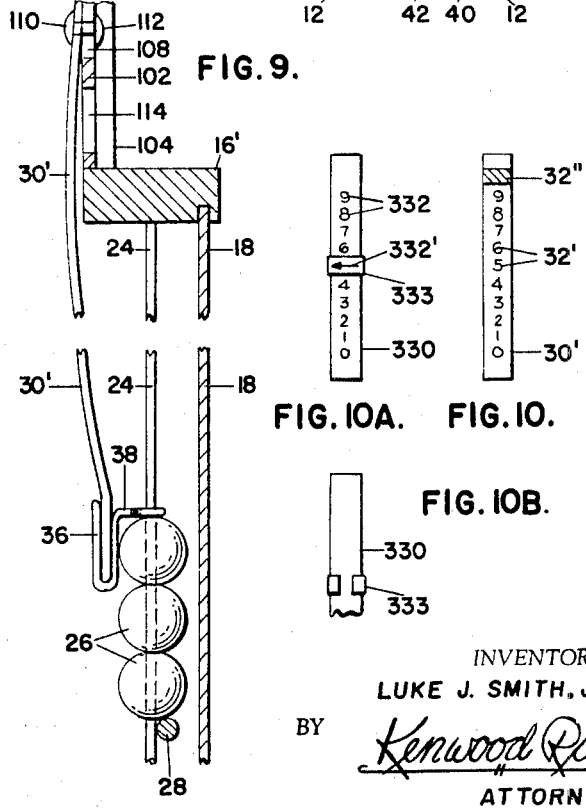
FIG. 9.
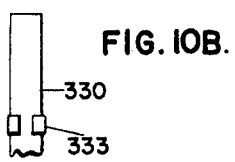
FIG. 10A. FIG. 10.
FIG. 10B.
INVENTOR.
LUKE J. SMITH, JR.
BY Kenwood Ross
ATTORNEY.

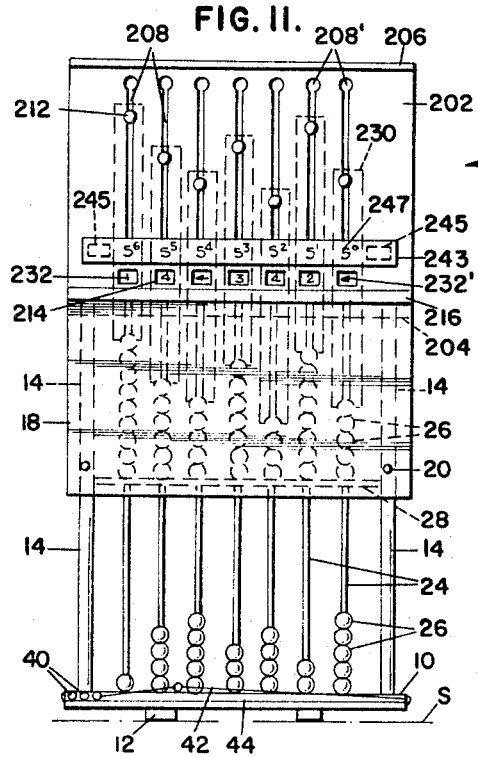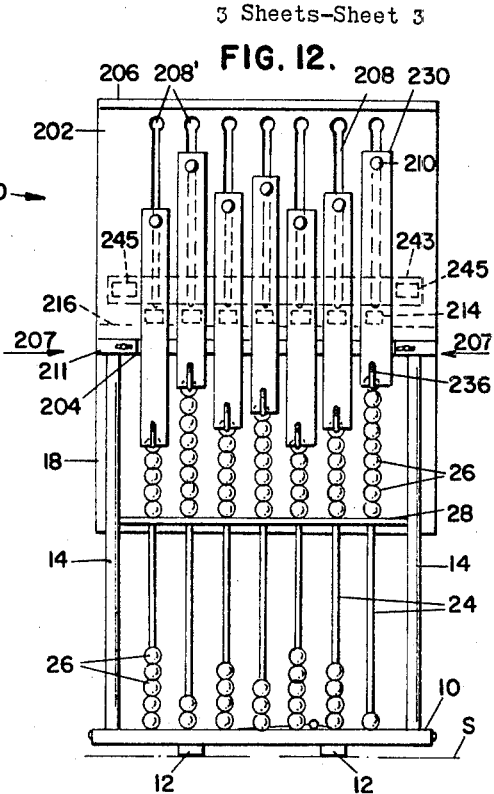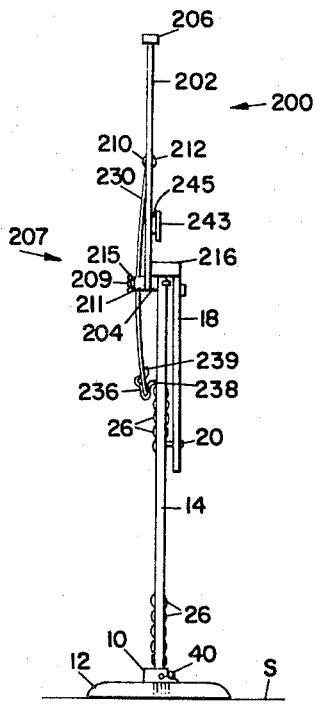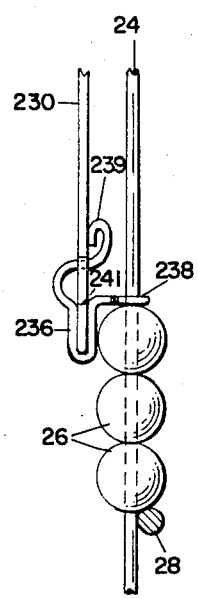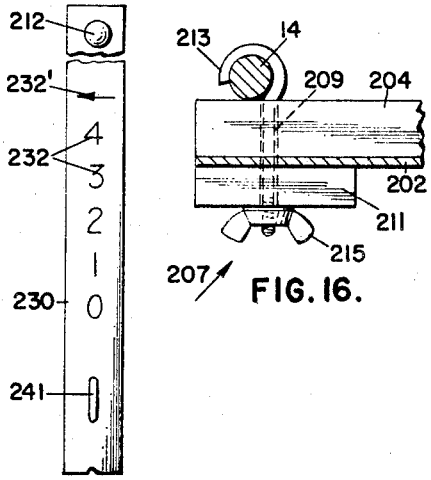

United States Patent Office 3,273,262
Patented Sept. 20, 1966

3,273,262
TEACHING DEVICE
Luke J. Smith, Jr., East Longmeadow, Mass., assignor to Milton Bradley Company, Springfield, Mass.
Filed July 27, 1964, Ser. No. 385,305
11 Claims. (Cl. 35—33)

The present invention relates to educational devices and more particularly to an improved abacus-type counting device.

The primary objects of the present invention are: to provide an improved teaching device which will enable a teacher more readily to help pupils to understand the base-ten and other numeration systems; to provide a device by which students will be able to perform such simple calculations as will make various numeration systems understood; to provide a device wherein each digit of the base-ten numeration system, 1 to 10, or other base numeration system, is represented by a corresponding number of objects, such as beads, the device having novel signal means for indicating the number of such objects to the pupil.

As another feature hereof, the signal means above alluded to are optionally releasably affixed to the counting device for ready removal therefrom and replacement with signal means carrying data for teaching other numeration systems. The signal means are automatically movable as the beads are moved to maintain a continuous count of the number of beads visible to the student, means being provided to conceal certain of the beads and certain of the numbers from view when not desired for the teaching purpose.

As another feature worthy of particular note, I provide supplemental beads which can be selectively positioned to show values in dollars and cents, or in tenths and/or hundredths and/or thousandths, and to indicate commas as common in numerals of thousands, ten thousands, hundred thousands, and millions.

These and other incidental ends and objectives will be more apparent from a consideration of the detailed specification here following and the accompanying drawings in which:

FIG. 6 is a front elevation of a counting device embodying a modified form of the invention;

FIG. 7 is a rear elevation thereof;

FIG. 8 is an end elevation thereof;

FIG. 9 is an enlarged fragmentary and broken vertical section taken through the counting device of FIG. 6;

FIG. 10 is a front elevation of the signal means of the modified form of the invention of FIGS. 6–9;

FIG. 10A is a front elevational view of a modified form of the signal means of the invention;

FIG. 10B is a fragmentary rear elevational view of the signal means of FIG. 10A;

FIG. 11 is a front elevation of a counting device embodying still another modified form of the invention;

FIG. 12 is a rear elevation thereof;

FIG. 13 is an end elevation thereof;

FIG. 14 is an enlarged fragmentary end elevation of the signal carrying means of the modified form of the invention of FIGS. 11–13;

FIG. 15 is an enlarged, broken front elevation of the signal means of the modified form of the invention of FIGS. 11–13; and FIG. 16 is an enlarged fragmentary top plan view of the releasable locking means of the modified form of the invention of FIGS. 11–13.

Figure 1:
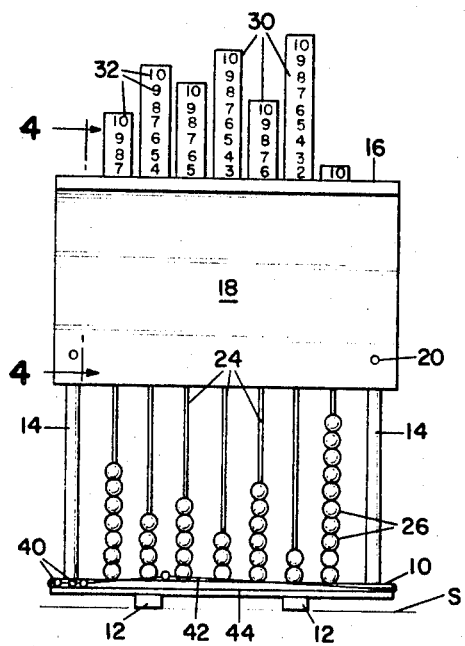
FIG. 1 is a front elevation of a counting device embodying one form of the present invention.
Figure 2:
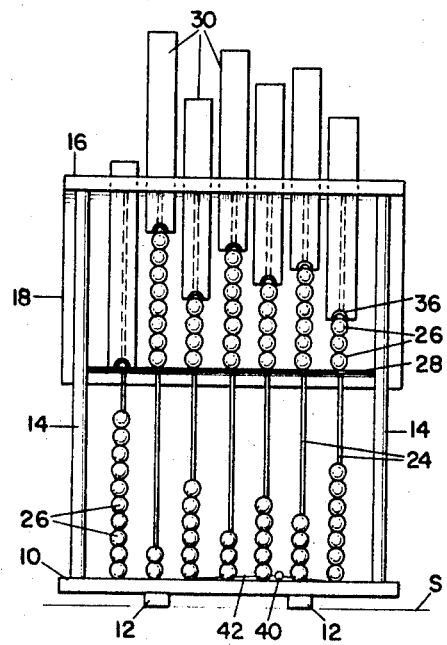
FIG. 2 is a rear elevation thereof.
Figure 3:
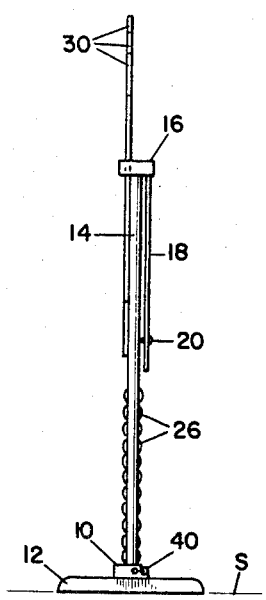
FIG. 3 is an end elevation thereof.
Figure 4:
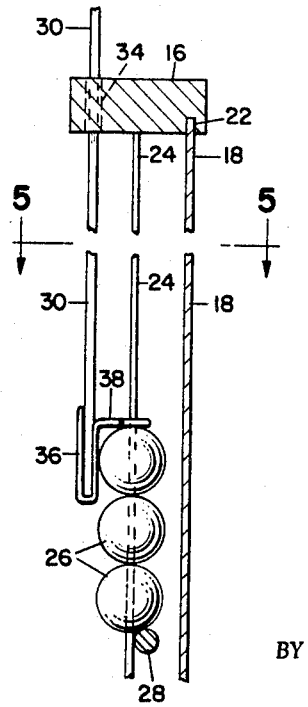
FIG. 4 is an enlarged fragmentary section on line 4—4 of FIG. 1.
Figure 5:
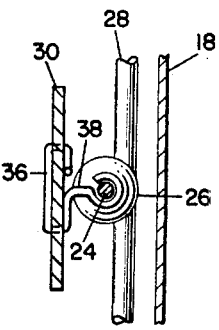
FIG. 5 is a fragmentary section on line 5—5 of FIG. 4.

Referring to FIGS. 1–5, the counting device representative of the preferred embodiment comprises a horizontally extending base rail 10 held in spaced parallel relation to any suitable supporting surface S as by feet 12.

A pair of spaced parallel vertically-extending posts 14 are fixed at their lower ends to base rail 10 and are fixed at their upper ends to a horizontally-extending top rail 16, same being disposed in parallel relation to the base rail with the top rail 16, base rail 10 and posts 14 defining a generally rectangular frame.

A panel member 18, which may be a chalkboard, flannel board, magnetic board, or equivalent, is fixed to posts 14 as by rivets 20 and will preferably have its upper end disposed in a longitudinally extending slot 22 provided in the lower surface of top rail 16.

A plurality of spaced, parallel, flexible metal rods 24 extend vertically between top and bottom rails 16 and 10 respectively rearwardly of panel member 18, each said rod forming a support for groups of calculating units, as, in the present instance, in the form of a plurality of wooden or plastic or other beads or balls 26, strung ten to a group on each of said rods.

To operate the several groups of beads, the teaching device is subdivided by a flexible metal cross rod 28 extending between posts 14 rearwardly of panel member 18 and in parallel relation to top rail 16 and bottom rail 10, said cross rod being so located therebetween as to provide an upper bead-retaining section of a length sufficient to permit all groups of beads to be stored thereagainst out of sight behind panel member 18 and a lower section of a length to permit all beads of each group to be moved downwardly therepast into view for demonstration purposes. In other words, the upper section serves for storage purposes from which the beads can be removed singly or in groups to the lower demonstrating section. The cross rod is disposed in abutting relation to rods 24 and thus forms a support for beads 26. By slightly flexing each rod 24, one or more beads can be readily passed over cross rod 28 and allowed to drop into position on the lower sections of rod 24.

Each of the rods 24 slideably supports a vertically-disposed signal means in the form of a card or flag 30, each such card or flag carrying numerical indicia 32 on one face thereof, the signal means each being adapted for vertically sliding movement through a longitudinally-extending slot 34 provided in top rail 16, there being a plurality of such slots in top rail 16, all of which are axially aligned relative to each other.

A clip 36 fixed to the lower end of each card or flag 30 has a curved extension 38 extending outwardly therefrom and loosely encircling the respective adjacent rod 24, the extension 38 resting on the uppermost bead 26 of each stack or group thereof.

The signal means 30 will be of such length, and the numerical indicia 32 will be so located thereon, that by reference to the numeral 32 immediately above top rail 16 a count of the number of beads 26 which have been dropped into view past cross rod 28 is offered. For example, the signal means 30 in FIG. 1 indicate that ten beads have been dropped into view on the first rod 24 and that two beads have been dropped into view on the second rod 24.

The signal means 30, being slideably related to the rods 24, are automatically raised or lowered as beads 26 are raised or lowered relative to the wires, thereby insuring an accurate count of the number of beads in view below cross rod 28.

For the purpose of indicating decimal points as well as commas in 4-digit numbers or larger, a plurality of supplemental beads 40 are provided, same being of smaller diameter than beads 26 and being slideably disposed on a resilient string 42 or the like provided on bottom rail 10.

The upper surface of bottom rail 10 will be longitudinally dished or grooved along the leading edge thereof, as at 44, to provide a ready receptacle for supplemental beads 40. Preferably, at least one of the supplemental beads 40 will be of a different color than its counterparts, with one color being used to indicate decimal points and the other color to indicate commas in numbers of one thousand and up. In use, supplemental beads 40 will be moved out of groove 44 and placed on the upper surface of bottom rail 10 between a pair of rods 24, the resilient string permitting such movement and disposition, so that any rod may become units, tens, tenths, etc.

In the modified form of the invention shown in FIGS. 6–10, the calculating device proper is substantially identical to that shown in FIGS. 1–5, and is modified by the addition of a supplemental frame or housing which serves as a guide for the signal means, (the top rail of the calculating device not being slotted in this embodiment), and to allow a means for concealing all of the indicia on the signal means from view with the exception of that indicia which indicates the number of beads disposed below the cross rod.

Said supplemental frame or housing, generally indicated by 100, extends vertically upwardly from top rail 16' substantially coplanar with the rear edge of the top rail and comprises a slotted guide member 102 coextensive with said top rail and braced relative to the top rail by side and top braces 104 and 106 respectively.

A plurality of spaced parallel vertically-extending slots 108 are provided in said guide member, each slot 108 being vertically aligned with one of the vertically-extending rods 24 disposed therebelow.

Each of the rods 24 slideably supports a vertically-disposed signal means in the form of a card or flag 30', each such card or flag 30' carrying numerical indicia 32' and color indicia 32'', to be described, on one face thereof, the signal means being disposed rearwardly of the rods 24, top rail 16' and guide member 102, and being adapted for vertical sliding movement relative to the vertically-extending slots 108 provided in the guide member.

A pin 110 fixed to each signal means 30' extends outwardly therefrom through one of the slots 108 in loose-fitting manner and has an enlarged head 112 adapted to bear against the forward face of the guide member 102.

One of the clips 36, is fixed to the lower end of each signal means 30', with a curved extension 38 loosely encircling the respective adjacent rod 24 and resting on the uppermost bead 26 of each stack or group thereof.

A plurality of sight openings 114 are provided in guide member 102 and are disposed in a horizontal row immediately above top rail 16', each sight opening being aligned with one of the slots 108.

As beads 26 are moved downwardly past cross bar 28, signal means 30' are moved downwardly therewith with pin 110 at the upper end of each signal means sliding freely in its slot 108 in the guide member.

Indicia 32' or 32'' on signal means 30' represent the number of beads below the cross bar and will be visible through sight openings 114 in the guide member, with the color indicia 32'' being substituted for the numeral ten to indicate that all ten beads have been moved into view.

In FIGS. 10A and 10B, I have shown a modified signal means 330 which may be advantageously employed to teach any base numeration system from 2 to 10. In this embodiment, the indicia 332 on the face of the signal means may be selectively covered or concealed from view by means of a shield 333 slideably related to the signal means in any suitable manner, the shield carrying indicia in the form of an arrow 332' on its forward face.

Let us say that the teacher wishes to teach the base five numeration system. He slides the shield upwardly or downwardly as appropriate relative to signal means 330 until the numeral 5 is covered by the shield. Now when five beads have been dropped into view below cross bar 28, the arrow 332' appears in the sight opening 114 to indicate to the pupil that he is to proceed to the next adjacent counting rod 24.

By the simple expedient of a slideable shield, one set of signal means can be employed to teach any base numeration system from 1 to 10.

In the modified form of the invention shown in FIGS. 11–16, the calculating device proper is substantially identical to that shown in FIGS. 6–10, and is modified in that the supplemental frame or housing which serves as a guide for the signal means is releasably attached to the calculating device, and serves as a means for concealing all of the indicia on the signal means from view with the exception of that indicia which indicates the number of beads disposed below the cross rod. In addition, the signal means are releasably fixed to the beads and to the supplemental frame for ready removal and substitution of signal means carrying indicia pertinent to other numeration systems, and additional indicia is carried by the supplemental frame to indicate the numeration system being taught.

The said supplemental frame or housing, which is generally indicated by 200, extends vertically upwardly from top rail 216 of the calculating device substantially coplanar with the rear edge of the top rail and comprises a slotted guide member 202 coextensive with said top rail and braced relative to the top rail by bottom and top braces 204 and 206 respectively.

Bottom brace 204 is disposed immediately below top rail 216 and extends longitudinally between and rearwardly of the vertically-extending posts 14 of the calculating device.

Supplemental frame 200 is releasably fixed to the calculating device by a pair of locking means generally indicated by 207, each comprising a threaded pin 209 extending loosely through horizontally-aligned openings provided in bottom brace 204, in slotted guide member 202 and in a locking block 211 disposed rearwardly of said guide member and embracing the rear face thereof.

Each pin 209 is bent at its innermost or forwardmost end to define a hook portion 213 adapted to partially encircle one of the posts 14 and will carry a wing nut 215 or equivalent in threaded engagement with its outermost or rearwardmost end and adapted to embrace the rear face of locking block 211.

To assemble supplemental frame 200 to the calculating device, the hook portion 213 of each pin 209 is placed on each post 14 immediately below top rail 216, so as to extend horizontally rearwardly and outwardly from the posts.

The supplemental frame is now placed on the pins 209, with the pins sliding freely through the aligned openings provided in the bottom brace 204 and guide member 202. The supplemental frame is pushed onto the pins until the bottom brace 204 thereof contacts the posts 14, at which time further inward movement is precluded and the forward face of the guide member 202 is contacting the rear face of top rail 216.

The pin 209 is now extending outwardly from guide member 202 a sufficient distance to permit locking block 211 to be slid onto the pin, whereupon wing nut 215 is threaded thereon to firmly clamp the bottom brace 204 and guide member 202 to each of the posts 14.

By reversing this procedure, supplemental frame 200 may be quickly removed from the calculating device.

A plurality of spaced, parallel, vertically-extending slots 208 are provided in guide member 202, each slot 208 being enlarged at its uppermost end to define an annular opening 208' for purposes to appear, and being vertically aligned with one of the vertically-extending rods 24 of the calculating device disposed therebelow.

Each of the rods 24 slideably supports a vertically-disposed signal means in the form of a card or flag 230, each such card or flag 230 carrying numerical indicia 232 and indicia 232' to be described, on one face thereof, the signal means being disposed rearwardly of the rods 24, top rail 216 and guide member 202, and being adapted for vertical sliding movement relative to the vertically-extending slots 208 provided in the guide member, as will appear.

A pin 210 fixed to each signal means 230 extends outwardly therefrom through one of the slots 208 in loose-fitting manner and has an enlarged head 212 adapted to bear against the forward face of guide member 202. The head 212 will be of slightly smaller diameter than that of the openings 208' at the upper ends of slots 208 so that the pins 210 may be moved out of the slots and the signal means removed from engagement with the guide means.

A clip 236 is releasably fixed to the lower end of each signal means 230 and includes a first curved extension 238 loosely encircling the respective adjacent wire 24 and resting on the uppermost bead 26 of each stack or group thereof, and a second vertical extension 239 extendable through a vertically-extending centrally-disposed slot 241 provided in each signal means 230 adjacent the lower end thereof.

As clearly seen in FIG. 14, extension 239 bears against the forward face of the signal means and is disposed upwardly of slot 241.

To remove the signal means 230 from the clip 236, the clip is pulled downwardly until the extension 239 is aligned with the slot. The lower end of the signal means is now moved forwardly and the extension passes freely through the slot to release the signal means from the clip. To place the signal means on the clip this procedure is simply reversed.

By this novel expedient, signal means carrying a wide range of indicia may be employed to teach various numeration systems, it being a simple matter to free the upper end of the signal means from its engagement with its slot 208 and the lower end of the signal means from its engagement with its clip 236.

In use, as the beads 26 are moved downwardly past cross bar 28, the signal means 230 are moved downwardly therewith with the pin 210 at the upper end of each signal means sliding freely in its slot 208 in the guide member.

A plurality of sight openings 214 are provided in guide member 202 and are disposed in a horizontal row immediately above top rail 216, each sight opening being aligned with one of the slots 208.

The indicia 232 or 232' on the signal means 230 represent the number of beads below the cross bar and will be visible through the sight openings 214 in the guide member, with the indicia 232' being in the form of an arrow and being substituted for a numeral to clearly indicate that reference should be had to the next wire for the next place value.

A card 243 is releasably held to the forward face of guide member 202 as by magnets 245 or any other suitable means and carries indicia 247 vertically aligned with the sight openings 214 indicating the proper place values for the particular numeration system being taught. In FIG. 11, while the card 243 and signal means 230 carry indicia for teaching the base-five numeration system, it will be understood that other cards for other numeration systems will also be provided.

With the base-five numeration system, when the fifth bead is dropped on a rod, the arrow 232' points to the left showing that the rod should be cleared and one bead placed on the next rod to the left to show the same value, i.e. five beads on rod one equals one bead on rod two. Thus 5 ones means 1 five and 0 ones.

The modified form of the device shown in FIGS. 11–16 is designed for interchangeable sets of cards to teach other numeration systems. The sets of cards are easily assembled to and removed from the device. The tops of the cards slip easily into the guide grooves and the slots at the bottom of the cards may be quickly engaged or disengaged from the clips.

The teaching device hereof, in any of its embodiments, can be used to teach number values, place values of figures of a number and the regrouping involved in basic operations. In the following examples for purposes of simplification, reference will be had to the base-ten numeration system, although it should be understood by substituting other cards, other numeration systems may be taught in similar manner.

*Developing number value*

By hiding all beads behind the panel member, the children are asked, "How many beads can you see?" The answer is "None." From this simple demonstration the idea of ZERO can be explained. When there are NO BEADS, there are ZERO BEADS. This is represented by the symbol 0 on each of the signal means.

Next, one bead is dropped into view on the first rod and identified with the symbol 1. This can be repeated through 1, 2, 3, 4 etc., through 10, with the number of beads being indicated by the signal means.

*To develop place value*

When ancient man conceived the idea of counting, he used pebbles as counters. In a hole scooped in the ground, he put one small stone to represent a possession such as a head of cattle. A man with many head of cattle, had a large pile of pebbles. It was a logical step for him to use a larger stone to take the place of many little stones. It was also natural that he should use his ten fingers in counting so he decided that the one larger stone should represent ten small stones.

From this simple beginning, came our place value system. Our word calculate comes from the Latin word for little stone, "calculus."

To teach place value, all beads are pushed up and out of sight. The first rod on the right in FIGS. 1 and 6 is the ones rod. On the panel member 18 the teacher indicates "ones" above this rod, saying, "Just as ancient man put ten pebbles in the hole, we put ten beads on the ones rod." He next drops the beads down the ones rod, one at a time, counting them out loud 1, 2, 3, 4, etc. while pointing to the numbers on the signal means, or while pointing to sight openings, as appropriate.

The teacher reminds the pupils that ancient man used one larger stone to equal ten pebbles and informs the class that the next rod to the left of the ones rod, is called the tens rod. On the panel member 18 the teacher indicates "tens" above this rod, stating that one bead on the tens rod is equal to ten beads on the ones rod. He then pushes back, out of sight, the ten beads on the ones rod and shows one bead on the tens rod saying, "This shows how we write 10. We mean, 1 bead on the tens rod and 0 beads on the ones rod," while pointing to the numerals 1 and 0 on the signal means.

In the same manner the teacher can show 20, 30, 40, etc. through 90.

*Three-digit numbers*

The teacher next tells the class that the third rod to the left is the hundreds rod, stating that in our system, ten tens is the same as one hundred. He shows this in the same way that he showed that ten ones are the same as one ten. He indicates "hundreds" above the third rod to the left, stating that one bead on the hundreds rod has the same value as ten beads on the tens rod and that in figures, one hundred is written 100, meaning 1 bead on the hundreds rod, 0 beads on the tens rod, and 0 heads on the ones rod. He points to the numerals 1, 0, 0 on the signal means to emphasize his remarks.

In the same way he can show 200, 300, etc. through 900.

He may show 1 bead on the ones rod and 1 bead on the tens rod, to illustrate the number 11 or eleven. In the same way he may show 12, twelve; 13, thirteen; 14, fourteen; and so forth.

The teacher can now have the pupils set up various numbers. Given a number such as 432, the pupil puts 4 beads on the hundreds rod, 3 beads on the tens rod and 2 beads on the ones rod. The numbers 4, 3 and 2 show on the signal means.

The teacher reminds the pupils that the value of a number is determined by its place, and that in the number 432, 4 in its place means 4 hundreds or 400; 3 in its place means 3 tens or 30; 2 in its place means 2 ones or 2.

To teach four digit numbers and up, the same procedure is followed, utilizing one of the supplemental beads, say a blue bead, between the rods 24 to indicate commas in numbers one thousand and up.

*Decimal numbers*

Using one of the supplemental beads 40, say a red bead, as a decimal point, the teacher explains that the rod to the right of the decimal point is the tenths rod and that each bead on this rod has a value of one tenth or 0.1 while ten beads on this rod are equal to ten tenths or 1.0. He reminds the class that this is also the value of one bead on the ones rod to the left of the decimal point. He then tells the class that the second rod to the right of the decimal point is the hundredths rod; the third rod to the right of the decimal point is the thousandths rod and so forth.

He may have a pupil set up the number 0.132, explaining that one bead in its place means one tenth or 0.1; three beads on the next rod mean three hundredths or 0.03 and two beads on the next rod mean two thousandths or 0.002, while pointing to the numbers 0, 1, 3 and 2 on the signal means.

Because our money system is based on the decimal system, dollars and cents can be shown in a similar manner.

*Facts of ten*

The device can be used to teach the facts of ten. All beads are placed in the lower position below the cross rod 28. Pointing to the number card 30 or 30', the teacher shows that there are ten beads on the first rod on the right. One bead is then pushed above the cross rod, to tell a number story as: "I had ten beads. I pushed one away. Now I have 9 beads and 1 bead. 9 and 1 are 10." This procedure can be repeated for the other facts in addition, subtraction, multiplication and division.

*Computing abacus place value addition*

All beads are placed in the hidden position and the teacher places the headings: ones, tens, hundreds on the panel member 18 above the first three rods. He then places 25+52=☐ on the panel member. He sets the number 25 in position by placing 5 beads on the ones rod and 2 beads on the tens rod and says, "We must now add 2 beads to the 5 ones," while dropping the 2 beads on the ones rod, counting 1, 2. He follows the same procedure by dropping 5 beads on the tens rod. He then points to the signal means and says, "We now have the answer, 77," and places 25+52=77 on the panel member.

He now places 137+594=☐ on the panel member and sets the number 137 in position with the beads, saying, "We must now add 4 beads to the 7 ones," dropping the beads on the ones rod, counting "1, 2, 3." Since one more bead is needed to make 4, he draws or places a round bead on the panel member in line with the first rod and says "4." He follows the same procedure on the tens rod, and the hundreds rod. To show carrying he must now regroup. Since 11 beads are shown on the ones rod, ten beads can be removed, including the one on the panel member, and another bead drawn or placed on the panel member above the tens rod. 13 beads are now represented on the tens rod. In removing ten beads from the tens rod, including the bead on the panel member, one more bead must be dropped on the hundreds rod to produce the answer 731. The teacher now places 137+594=731 on the panel member and points to the numbers 7, 3 and 1 on the signal means.

*Place value subtraction*

The teacher places 57−25=☐ on the panel member and sets the number 57 in position by placing 7 beads on the ones rod and 5 beads on the tens rod. To subtract 25, he places 5 beads from the ones rod and 2 beads from the tens rod in the hidden position to give the answer 32. He places 57−25=32 on the panel member pointing to the numbers 3 and 2 on the signal means.

He now places 582−324=☐ on the panel member and positions beads on the first three rods to show 582. Since 4 beads cannot be taken from 2 beads, it is necessary to regroup. One bead is taken from the tens rod, and ten beads are added to the ones rod. To add the ten beads to the ones rod, he drops the eight hidden beads and draws or places two beads on the panel member above the ones rod. Now he takes away four beads from the ones rod including the two beads on the panel member. On the tens rod, two beads must be taken from the seven that are there and on the hundreds rod three beads must be taken away to produce the answer 258. He places 582−324=258 on the panel member pointing to the numbers 2, 5 and 8 on the signal means.

*Place value multiplication*

Multiplication is the same basic process as addition. Because the same number is added to itself a stated number of times, the actual computation can be shortened by using the multiplication process.

The teacher places 23×3=△ on the panel member and starts with all the beads in the hidden position. He sets the number 23 in position by placing 3 beads on the ones rod and 2 beads on the tens rod. He repeats this twice more so that there are 9 beads on the ones rod and 6 beads on the tens rod to produce the answer 69. He places 23×3=69 on the panel member pointing to the numbers 6 and 9 on the signal means.

He next places 281×12=△ on the panel member and places the word, thousands, above the rod to the left of the hundreds rod.

He explains that multiplying by 12 is the same as multiplying 281 by 10 and then 281 by 2 and adding the products. He adds that because we use the base ten system, we have multiplied by ten when each group of beads on the rods are moved one rod to the left. 281 multiplied by 10 becomes 2810. This is set up on the rods 24. He now multiplies 281 by 2. Thus two beads are added to the ones rod, 16 beads (including 7 beads on the panel member) are added to the tens rod. Four beads are added to the hundreds rod. Regrouping, he takes ten beads from the tens rod and adds one bead to the hundreds rod. He then takes ten beads from the hundreds rod and adds one bead to the thousands rod to produce the answer 3372. He places 281×12=3372 on the panel member and points to these numbers on the signal means.

As already explained, all of the above processes may be repeated using other base numeration systems, all without departing from the spirit and scope of the invention.

The teaching device hereof has many more applications that will aid the teacher in presenting his day-by-day arithmetic lessons. In using it, he will find that it is extremely versatile and has many more uses as an arithmetic aid for the elementary grades.

I claim:

1. A teaching device comprising in combination, a frame, a plurality of vertically-disposed denominationally-ordered flexible metal rods carried by said frame and forming spaced rows, a group of beads strung on each said rod for sliding movement relative thereto, a signal means slideably disposed on each said rod and resting on the uppermost bead of each group thereof, said signal means each carrying numerical indicia indicating the number of beads in each group, and a horizontal support on said frame intermediate the length thereof for supporting all bead groups in such manner that flexing of any said rod releases and drops a selected number of beads from said support to form a sequence supported by the bottom of said frame and corresponding to a selected number readable on said signal means.

2. In a teaching device as set forth in claim 1 including, a panel member on said frame normally concealing said beads from view and providing a surface for entering data thereon pertaining to the concept being taught.

3. In a teaching device as set forth in claim 1 including, a plurality of supplemental decimal beads on said frame removably positionable between said rods for indicating decimals and commas and dollars and cents.

4. A teaching device comprising, a frame having top and bottom members in juxtaposed position, means to support said frame in a vertical position, a plurality of vertically disposed denominationally ordered flexible metal rods stretched between said top and bottom members to form spaced rows, a flexible cross rod horizontally subdividing said frame into upper and lower sections, said cross rod being in substantial abutting relation to said flexible metal rods, groups of beads strung respectively on said flexible metal rods for movement from one section to the other, said cross rod supporting any beads moved into said upper section but permitting release of any beads by flexing said flexible metal rods and said flexible cross rod, each bead group comprising ten beads, a number card for each bead group movable therewith, said number cards being slideably related to said rods and carrying numerical indicia thereon comprising numerals from 0 to 10, and panel means on said frame for concealing any beads in the upper section from view.

5. A teaching device comprising, a main frame, a plurality of vertically disposed denominationally ordered flexible metal rods carried by said main frame and forming spaced rows, a group of beads strung on each rod for sliding movement relative thereto, a supplemental frame including a slotted guide panel extending outwardly from said main frame, a plurality of sight openings in said guide panel, a signal means slideably disposed on each said rod and resting on the uppermost bead of each group thereof, said signal means each being slideably related to the slots in said guide panel and carrying indicia thereon, and a horizontal support on said main frame intermediate the length thereof for supporting all bead groups in such manner that flexing any rod releases and drops a selected number of beads from said support to form a sequence supported by the bottom of said main frame and corresponding to selected indicia readable on said signal means through said sight openings.

6. In a teaching device as set forth in claim 5 wherein said signal means slideably disposed on each said rod comprises a card bearing numerical indicia and color indicia on one face thereof.

7. In a teaching means as set forth in claim 5 wherein said signal means slideably disposed on each said rod comprises a card bearing numerical indicia and an arrow on one face thereof to indicate regrouping.

8. In a teaching means as set forth in claim 5 wherein said supplemental frame is releasably affixed to said main frame and wherein said signal means are releasably affixed to said rods and to said guide panel.

9. In a teaching means as set forth in claim 5 including a card releasably affixed to said guide panel carrying indicia indicating the numeration system being taught.

10. A teaching device comprising, a main frame having top and bottom members in juxtaposed position, means to support said main frame in a vertical position, a plurality of vertically disposed denominationally ordered flexible rods stretched between said top and bottom members to form spaced rows, a flexible cross rod horizontally subdividing said frame into upper and lower sections, said cross rod being in substantial abutting relation to said rods, groups of beads strung respectively on said rods for movement from one section to the other, said cross rod supporting any beads moved into said upper section but permitting release of any beads by flexing said rods, each bead group comprising ten beads, a supplemental frame extending upwardly from said main frame comprising a guide panel supported relative to said top member by side and top braces, a vertically-extending slot in said guide panel for each of said rods, a sight hole in said guide panel for each of said slots, a number card for each bead group and movable therewith, said number cards being slideably related to said rods and said guide panel slots and carrying numerical indicia thereon comprising numerals from 0 to 9 and color indicia thereon representing the numeral 10, said numerical indicia and said color indicia being selectively readable through said sight openings as said beads are moved between the upper and lower sections, and panel means on said main frame concealing any beads in the upper section from view.

11. In a teaching device as set forth in claim 5 wherein said signal means slideably disposed on each said rod comprises a card bearing numerical indicia on one face thereof and a shield slideably related to said signal means for selectively concealing said numerical indicia from view, said shield bearing an arrow on one face thereof to indicate regrouping.

References Cited by the Examiner

UNITED STATES PATENTS

| | | | |
|---|---|---|---|
| 692,019 | 1/1902 | Kolshorn | 35—32 |
| 2,457,332 | 12/1948 | Wade et al. | 35—33 |

EUGENE R. CAPOZIO, *Primary Examiner.*